United States Patent Office 3,055,798
Patented Sept. 25, 1962

3,055,798
NEW ORGANIC PHOSPHORUS COMPOUNDS AND THEIR MANUFACTURE AND USE
Ernst Beriger, Allschwil, Switzerland, assignor to Ciba Limited, Basel, Switzerland, a company
No Drawing. Filed Feb. 21, 1961, Ser. No. 90,626
Claims priority, application Switzerland Feb. 24, 1960
13 Claims. (Cl. 167—22)

This invention provides organic compounds of the general formula

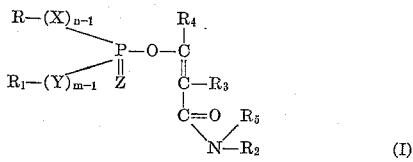
(I)

in which R and $R_1$ each represent an alkyl, cycloalkyl, aralkyl, aryl or heterocyclic radical which may be substituted, or R and $R_1$ together from part of a ring system, $R_2$ represents an alkyl-aryl or an alkyl radical interrupted by at least one oxygen or sulfur atom, $R_3$ represents a hydrogen atom, a halogen atom or an alkyl radical, $R_4$ represents an aliphatic, alicyclic, aromatic or heterocyclic radical, and $R_5$ represents a hydrogen atom, an alkyl radical or the same radical as $R_2$, X and Y each represent —O—, —S—, —NH— or

where R has the meaning given above, Z represents an oxygen or sulfur atom and $n$ and $m$ each represent the whole number 1 or 2.

The above new compounds are valuable agents for combating pests especially harmful insects and acarids. They are active against the various stages of development such as eggs, larvae and imagines and they act as contact and stomach poisons. Especially valuable as insecticides are compounds of the general formula

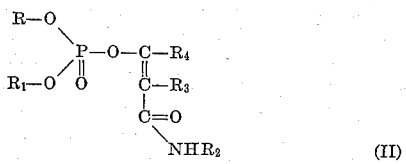
(II)

in which R and $R_1$ each represent an alkyl radical containing 1 to 4 carbon atoms and advantageously a methyl or ethyl radical, $R_2$ represents a radical of the formula

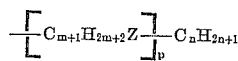

or of the formula

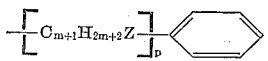

in which $m$, $n$ and $p$ each represent a whole number from 1 to 4, Z represents an oxygen or sulfur atom, and especially a methoxyethyl, ethoxyethyl, propoxyethyl, butoxyethyl or phenoxyethyl radical, $R_3$ represents a hydrogen atom or a chlorine atom, and $R_4$ represents a lower alkyl radical, especially a methyl radical, or a phenyl radical which may be substituted.

This invention also provides a process for the manufacture of the above new compounds, wherein a compound of the formula

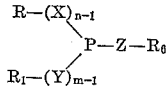
(III)

in which R, $R_1$, $n$, $m$, X, Y and Z have the meanings given above, and $R_6$ represents an alkyl radical containing 1 to 4 carbon atoms, is condensed with a compound of the formula

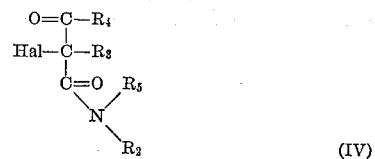
(IV)

in which $R_2$, $R_3$, $R_4$ and $R_5$ have the meanings given above and Hal represents a halogen atom, such as bromine or advantageously chlorine, the condensation being accompanied by the splitting off of a compound of the formula $R_6$Hal.

Alternatively the new compounds can be made by reacting a compound of the formula

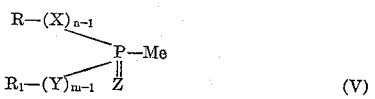
(V)

in which R, $R_1$, $n$, $m$, X, Y and Z have the meanings given above, and Me represents an alkali metal, advantageously sodium with a compound of the formula

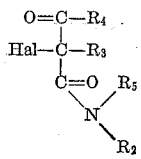

in which $R_2$, $R_3$, $R_4$, $R_5$ and Hal have the meanings given above. For making compounds in which $R_3$ represents a hydrogen atom or an alkyl radical, the following condensation may be carried out:

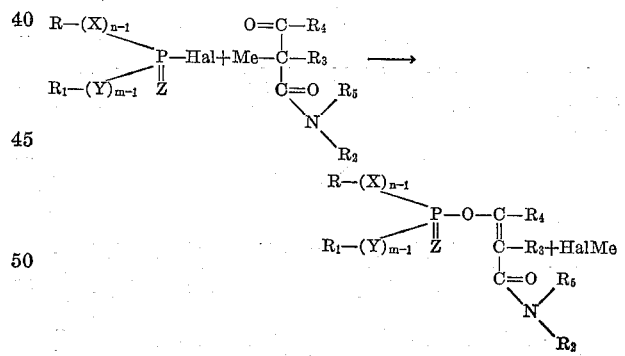

The choice of the particular sequence of reactions used depends on the accessibility of the starting materials.

The compounds of the above Formula III used as starting materials are derivatives of trivalent phosphorus, whereas the compounds of the invention are derivatives of pentavalent phosphorus.

Among compounds of the Formula III, those in which the symbols X, Y and Z each represent an oxygen atom, are most easily obtainable. They correspond to the general formula

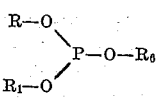

and can be made by methods in themselves known.

The aliphatic radicals, which the symbols R and $R_1$ may represent, may have a straight or branched chain and may be saturated or unsaturated. Furthermore, they may be substituted or unsubstituted. There may be mentioned the following groups: methyl, ethyl, propyl, isopropyl, butyl, hexyl, 2-ethylbutyl-octyl, 2-butyl-octyl, dodecyl, octadecyl, allyl or 2-chlorethyl groups. The radicals R and $R_1$ may be identical or different from each other. $R_6$ is an alkyl radical containing 1 to 4 carbon atoms. There may be mentioned, for example, the following compounds: trimethyl phosphite, triethyl phosphite, tripropyl phosphite, diethyl dodecyl phosphite, tri-(2-chlorethyl)-phosphite or the ester of the formula

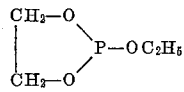

The aromatic radicals which R and $R_1$ may represent, may be mononuclear or polynuclear, and they may contain nuclear substituents. There may be mentioned phenyl, 2- or 4-chlorophenyl, 2:4-dichlorophenyl, 4-methoxyphenyl, 4-nitrophenyl, naphthyl and 4-diphenyl radicals. There may be mentioned compounds such as 2:4-dichlorophenyl-diethyl phosphite and 4-chlorophenyl-dimethyl phosphite. There may also be mentioned compounds in which 1 or 2 radicals are bound directly by a carbon atom to the phosphorus atom, for example, phenyl-phosphinic acid diethyl ester of the formula

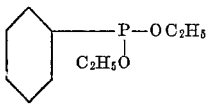

Among araliphatic radicals which R and $R_1$ may represent, there may be mentioned the benzyl radical, among cycloaliphatic radicals the cyclohexyl group, and among heterocyclic radicals the tetrahydrofurfuryl group. Starting materials containing such radicals, are for example, cyclohexyl diethyl phosphite, tetrahydro-furfuryl dimethyl phosphite or dibenzyl propyl phosphite. Among compounds in which X and Y each represent a sulfur atom there may be mentioned triethyl thiophosphite of the formula

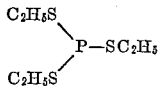

and among those in which X and Y represent a nitrogen atom, there may be mentioned the compound of the formula

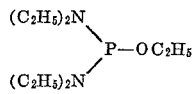

The compounds of the Formula V are salts of disubstituted phosphites or phosphonous acids, such, for example, as a sodium salt of dimethyl phosphite, diethyl phosphite, dodecylethyl phosphite, cyclohexyl methyl phosphite, tetrahydrofurfuryl ethyl phosphite or benzyl ethyl phosphite.

The compounds of the formula

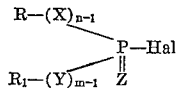

are phosphoric acid monohalides, for example, phosphoric acid diethyl ester mono chloride, thiophosphoric acid diethyl ester mono chloride and bis-dimethylamido-phosphoric acid mono chloride.

The compounds of the above Formula IV are amides of halogenated acylacetic acids derived from aliphatic, alicyclic, aromatic or heterocyclic carboxylic acids, and advantageously aceto-, benzoyl-, hexahydrobenzoyl-, furoyl- or tetrahydrofuroyl-acetic acid, with monoalkyl ethers or monoaryl ethers of aliphatic amines or the corresponding thio-ethers. The radical $R_2$ may be an alkyl-aryl radical or an alkyl radical interrupted by at least one ether-oxygen bridge or a sulfide bridge, and especially a group of the formula

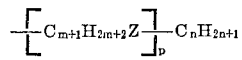

or of the formula

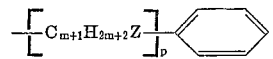

in which m, n and p each represent a whole number from 1 to 4 and Z represents an oxygen or sulfur atom. Such a radical advantageously represents a lower alkoxy alkyl group, such as the methoxyethyl, ethoxyethyl, propoxyethyl, butoxyethyl or a phenoxyalkyl group, such as the phenoxyethyl group. The radical $R_3$ may represent a halogen atom, advantageously a chlorine atom, or a hydrogen atom or an alkyl radical advantageously containing 1 to 4 carbon atoms, such as the methyl group. $R_4$ may represent a heterocyclic radical, such as the furfuryl or tetrahydrofurfuryl group, or an aryl radical, for example, the phenyl, chlorophenyl or nitrophenyl group, or a cycloalkyl radical, such as the cyclohexyl group or an alkyl radical such as the methyl or ethyl group. Among reaction components of the Formula IV there may be mentioned: α-chloracetoacetic acid 2-methoxyethylamide, α-chloracetoacetic acid-2-phenoxyethylamide, α:α-dichloracetoacetic acid-2-ethoxy-ethylamide, α:α-dichloracetoacetic acid-2-phenoxyethylamide, α:α-dichlorobenzoyl-acetic acid-2-ethoxyethylamide, α:α-dichlorobenzoylacetic acid-2-methoxyethylamide, α:α-dichloro-4-chloro-benzoylacetic acid-2-ethoxyethylamide, α-chloro-4-nitrobenzoylacetic acid-2-ethoxyethylamide, α:α-dichlorofuroylacetic acid-2-ethoxyethylamide and α:α-dichlorohexahydrobenzoylacetic acid-2-ethoxyethylamide.

For making the compounds of the invention the reaction components are heated at a raised temperature, for example, 50 to 200° C., and advantageously about 90 to 150° C. It may be of advantage or convenient to work in an inert solvent, such as benzene, toluene, xylene, chlorobenzene or benzine, and, if desired, in an atmosphere of an inert gas, for example, under nitrogen, and/or under reduced pressure. As stated, the compounds of the invention are valuable agents for combating pests, and they are more especially insecticides and acaricides.

Accordingly, the invention also provides preparations for combating pests, which comprise as active substance a compound of the invention in admixture with a liquid or solid diluent. The compounds used are advantageously those of the general Formula II.

A very wide variety of objects or materials can be protected against pests, including harmful insects and acarids and as carriers for the active substances there may be used gaseous, liquid or solid substances. As such objects or materials to be protected or to be used as carriers there may be mentioned, for example, air, especially in rooms, or liquids, for example, the water in ponds, and finally any dead or living substrata, for example, any objects in living rooms, cellars, attics or stables, and also pelts, feathers, wool or the like, and living organisms of the plant or animal kingdom in all their various stages of development, provided that they are insensitive to the pest combating agents.

The combating of pests is carried out by the usual methods, for example, by treating the object or material to be protected with the active compound in the form of vapor, for example, as a fumigant, or in the form of a dusting preparation or spraying preparation, for example, a solution or suspension which may be prepared with water or a suitable organic solvent, for example, alcohol, petroleum, a tar distillate or the like. There may also be used aqueous solutions or aqueous emulsions of organic solvents which contain the active substances, for brushing, spraying or immersing the objects or materials to be protected.

The spraying or dusting preparations may contain the usual inert fillers or marking agents, for example, kaoline, gypsum or bentonite, or other additions, such as sulfite cellulose waste liquor, cellulose derivatives or the like, and also the usual wetting or adherent agents for improving the wetting capacity and adherence of the preparations. The pest combating preparations may be in powder form, in the form of aqueous dispersions or pastes, or in the form of self-dispersing oils.

The compounds can be used singly in pest combating preparations or in conjunction with other insecticides or fungicides. The use of such preparations in plant protection is carried out by the usual spraying, watering, dusting or fumigating methods.

The new compounds are distinguished by their surprisingly low toxicity towards warm blooded animals.

The following examples illustrate the invention the parts and percentages being by weight unless otherwise stated and the relationship of parts by weight to parts by volume being the same as that of the kilogram to the liter.

EXAMPLE 1

A mixture of 17.5 parts of α-monochloracetoacetic acid methoxypropylamide and 30 parts by volume of chlorobenzene is heated to the boil and 13 parts of trimethyl phosphite are added dropwise. To complete the reaction the mixture is maintained for a further hour at 130 to 140° C. At the end of this period 3.3 parts of methyl chloride will have been collected in a cooled receptacle. The readily volatile portions are removed in vacuo at 100° C., and there are obtained as residue 21.9 parts of the compound of the formula

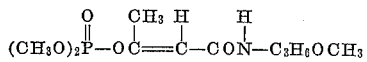

*Analysis.* — Calculated: P=11.02%. Found: P=10.3%.

Toxicity (rats, per os): LD 50, 140 p.p.m.; LD 100, 200 p.p.m.

EXAMPLE 2

In a manner analogous to that described in Example 1 17.5 parts of α-monochloracetoacetic acid methoxypropyl amide in 30 parts by volume of chlorobenzene are reacted with 17.4 parts of triethyl phosphite. There are obtained 27.1 parts of a compound of the formula

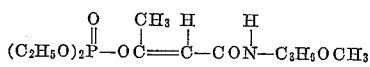

*Analysis.*—Calculated: P=10.01%. Found: P=9.6%.

EXAMPLE 3

In a manner analogous to that described in Example 1 21.1 parts of α:α-dichloracetoacetic acid methoxypropyl amide in 30 parts by volume of chlorobenzene are reacted with 13 parts of trimethyl phosphite. There are obtained 27.8 parts of a compound of the formula

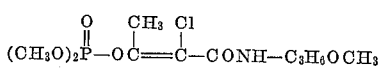

*Analysis.*—Calculated: P=9.81%. Found: P=10.2%.
Toxicity (rats, per os): LD 50, 150 p.p.m.

EXAMPLE 4

(*a*) In a manner analogous to that described in Example 1, 21.1 parts of α:α-dichloracetoacetic acid methoxypropyl amide in 30 parts by volume of chlorobenzene are reacted with 17.4 parts of triethyl phosphite. There are obtained 32.6 parts of a compound of the formula

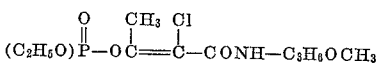

*Analysis.*—Calculated: P=9.01%. Found: P=9.3%.

(*b*) In a manner analogous to that described in Example 1 there can also be obtained compounds Nos. 1–26 in the following Table I:

Table I

| Compound No. | Acid amide | Degree of halogenation of the acid amide in α-position | Phosphite | Condensation product and its analysis |
|---|---|---|---|---|
| 1 | CH₃COCH₂CON⟨CH₃ / C₂H₄OCH₃ | Monochloride | (CH₃O)₃P | (CH₃—O)₂P(O)—OC(CH₃)=C(H)—CON(CH₃)(C₂H₄OCH₃) <br> P calc.: 11.01%. P found: 10.4%. |
| 2 | CH₃COCH₂CON⟨CH₃ / C₂H₄OCH₃ | do | (C₂H₅O)₃P | (C₂H₅O)₂P(O)—OC(CH₃)=C(H)—CON(CH₃)(C₂H₄OCH₃) <br> P calc.: 10.02%. P found: 9.8%. |
| 3 | CH₃COCH₂CON⟨CH₃ / C₂H₄OCH₃ | Dichloride | (CH₃O)₃P | (CH₃—O)₂P(O)—OC(CH₃)=C(Cl)—CON(CH₃)(C₂H₄OCH₃) <br> P calc.: 9.81%. P found: 9.5%. |
| 4 | CH₃COCH₂CON⟨CH₃ / C₂H₄OCH₃ | do | (C₂H₅O)₃P | (C₂H₅O)₂P(O)—OC(CH₃)=C(Cl)—CON(CH₃)(C₂H₄OCH₃) <br> P calc.: 9.01%. P found: 9.5%. |
| 5 | CH₃COCH₂CON⟨H / C₂H₄OCH₃ | Monochloride | (CH₃O)₃P | (CH₃—O)₂P(O)—OC(CH₃)=C(H)—CON(H)(C₂H₄OCH₃) <br> P calc.: 11.59%. P found: 11.4%. |
| 6 | CH₃COCH₂CON⟨H / C₂H₄OCH₃ | do | (C₂H₅O)₃P | (C₂H₅O)₂P(O)—OC(CH₃)=C(H)—CONH—C₂H₄OCH₃ <br> P calc.: 10.49%. P found: 10.2%. |
| 7 | CH₃COCH₂CON⟨H / C₂H₄OCH₃ | Dichloride | (CH₃O)₃P | (CH₃—O₂)P—OC(CH₃)=C(Cl)—CON(H)—C₂H₄OCH₃ <br> P calc.: 10.27%. P found: 10.6%. |

3,055,798

*Table I—Continued*

| Compound No. | Acid amide | Degree of halogenation of the acid amide in α-position | Phosphite | Condensation product and its analysis |
|---|---|---|---|---|
| 8 | $CH_3COCH_2CON\begin{matrix}H\\C_2H_4OCH_3\end{matrix}$ | Dichloride | $(C_2H_5O)_3P$ | $(C_2H_5O)_2\overset{O}{\overset{\|}{P}}-O\overset{CH_3}{\overset{\|}{C}}=\overset{Cl}{\overset{\|}{C}}-CONH-C_2H_4OCH_3$<br>P calc.: 9.39%. P found: 9.9%. |
| 9 | $CH_3COCH_2CON(C_2H_4OCH_3)_2$ | Monochloride | $(CH_3O)_3P$ | $(CH_3O)_2\overset{O}{\overset{\|}{P}}O\overset{CH_3}{\overset{\|}{C}}=CH-CON(C_2H_4OCH_3)_2$<br>P calc.: 9.52%. P found: 7.27%. |
| 10 | $CH_3COCH_2CON(C_2H_4OCH_3)_2$ | do | $(C_2H_5O)_3P$ | $(C_2H_5O)_2\overset{O}{\overset{\|}{P}}O\overset{CH_3}{\overset{\|}{C}}=CH-CON(C_2H_4OCH_3)_2$<br>P calc.: —.—%. P found: —.—%. |
| 11 | $CH_3COCH_2CON(C_2H_4OCH_3)_2$ | Dichloride | $(CH_3O)_3P$ | $(CH_3O)_2\overset{O}{\overset{\|}{P}}O\overset{CH_3}{\overset{\|}{C}}=\overset{Cl}{\overset{\|}{C}}-CON(C_2H_4OCH_3)_2$<br>P calc.: 8.61%. P found: 7.98%. |
| 12 | $CH_3COCH_2CON(C_2H_4OCH_3)_2$ | do | $(C_2H_5O)_3P$ | $(C_2H_5O)_2\overset{O}{\overset{\|}{P}}O\overset{CH_3}{\overset{\|}{C}}=\overset{Cl}{\overset{\|}{C}}-CON(C_2H_4OCH_3)_2$<br>P calc.: 7.99%. P found: 8.4%. |
| 13 | $CH_3COCH_2CONHC_2H_4O-C_6H_5$ | Monochloride | $(CH_3O)_3P$ | $(CH_3O)_2\overset{O}{\overset{\|}{P}}O\overset{CH_3}{\overset{\|}{C}}=\overset{H}{\overset{\|}{C}}-CONHC_2H_4O-C_6H_5$<br>P calc.: 9.41%. P found 8.94%. |
| 14 | $CH_3COCH_2CONHC_2H_4O-C_6H_5$ | Dichloride | $(CH_3O)_3P$ | $(CH_3O)_2\overset{O}{\overset{\|}{P}}O\overset{CH_3}{\overset{\|}{C}}=\overset{Cl}{\overset{\|}{C}}-CONHC_2H_4O-C_6H_5$<br>P calc. 8.52%. P found: 7.9%. |
| 15 | $CH_3COCH_2CONHC_2H_4O-C_6H_5$ | do | $(C_2H_5O)_3P$ | $(C_2H_5O)_2\overset{O}{\overset{\|}{P}}O\overset{CH_3}{\overset{\|}{C}}=\overset{Cl}{\overset{\|}{C}}-CONHC_2H_4O-C_6H_5$<br>P calc.: 7.91%. P found: 8.4%. |
| 16 | $CH_3COCH_2CON\overset{CH_3}{\overset{\|}{-}}C_2H_4OC_2H_4OCH_3$ | do | $(CH_3O)_3P$ | $(CH_3O)_2\overset{O}{\overset{\|}{P}}O\overset{CH_3}{\overset{\|}{C}}=\overset{Cl}{\overset{\|}{C}}-CO\overset{CH_3}{\overset{\|}{N}}-C_2H_4OC_2H_4OCH_3$<br>P calc.: 8.61%. P found: 7.8%. |
| 17 | $CH_3COCH_2CONHC_2H_4SCH_3$ | do | $(C_2H_5O)_3P$ | $(C_2H_5O)_2\overset{O}{\overset{\|}{P}}O\overset{CH_3}{\overset{\|}{C}}=\overset{Cl}{\overset{\|}{C}}-CO-NH-C_2H_4SCH_3$<br>P calc.: 8.96%. P found: 9.11%. |
| 18 | $CH_3COCH_2CONHC_2H_4SCH_3$ | Monochloride | $(C_2H_5O)_3P$ | $(C_2H_5O)_2\overset{O}{\overset{\|}{P}}O\overset{CH_3}{\overset{\|}{C}}=\overset{H}{\overset{\|}{C}}-CONHC_2H_4SCH_3$<br>P calc.: 9.95%. P found: 9.4%. |
| 19 | $CH_3COCH_2CONHC_3H_6OCH_3$ | do | $(isoC_3H_7O)_3P$ | $(isoC_3H_7O)_2\overset{O}{\overset{\|}{P}}O\overset{CH_3}{\overset{\|}{C}}\equiv CHCONHC_3H_6OCH_3$<br>P calc.: 9.18%. P found: 9.46%. |
| 20 | $CH_3COCH_2CONHC_3H_6OCH_3$ | Dichloride | $(isoC_3H_7O)_3P$ | $(isoC_3H_7O)_2\overset{O}{\overset{\|}{P}}O\overset{CH_3}{\overset{\|}{C}}=\overset{Cl}{\overset{\|}{C}}-CONHC_3H_6OCH_3$<br>P calc.: 8.33%. P found: 8.71%. |
| 21 | $CH_3COCH_2CONHC_3H_6OCH_3$ | do | $(CH_2=CH-CH_2O)_3P$ | $(CH_2=CH-CH_2O)_2\overset{O}{\overset{\|}{P}}O\overset{CH_3}{\overset{\|}{C}}=\overset{Cl}{\overset{\|}{C}}-CONHC_3H_6OCH_3$<br>P calc.: 8.38%. P found: 8.29%. |
| 22 | $CH_3COCH_2CONHC_3H_6OCH_3$ | Monochloride | $\begin{matrix}(C_2H_5O)_2\\C_6H_4\!\!<\!\!_{CH_2O}^{P}\end{matrix}$ | $\begin{matrix}C_2H_5O\\C_6H_4\!\!<\!\!_{CH_2O}^{P(O)}\end{matrix}O\overset{CH_3}{\overset{\|}{C}}=CH-CONHC_3H_6OCH_3$<br>P calc.: 8.34%. P found: 9.3%. |
| 23 | $CH_3COCH_2CONHC_3H_6OCH_3$ | Dichloride | $\begin{matrix}(C_2H_5O)_2\\C_4H_6O\!\!<\!\!_{CH_2O}^{P}\end{matrix}$ | $\begin{matrix}C_2H_5O\\C_4H_6O\!\!<\!\!_{CH_2O}^{P(O)}\end{matrix}O\overset{CH_3}{\overset{\|}{C}}=\overset{Cl}{\overset{\|}{C}}-CONHC_3H_6OCH_3$ |

Table I—Continued

| Compound No. | Acid amide | Degree of halogenation of the acid amide in α-position | Phosphite | Condensation product and its analysis |
|---|---|---|---|---|
| 24 | $CH_3COCH_2CONCH_3H_6OCH_3$ | Dichloride | $(C_2H_5O)_2P$-O-C$_6H_4$-O | $C_6H_4$-O-$\overset{O}{\overset{\|}{P}}$(OC$_2$H$_5$)-OC(Cl)=C-CONHC$_3$H$_6$OCH$_3$ <br> P calc.: 7.75%. P found: 7.86%. <br> P calc.: 7.79%. P found: 8.7%. |
| 25 | $CH_3COCH_2CONCH_3H_6OCH_3$ | do | $(C_2H_5O)_2P$-O-C$_6H_4$ | $C_6H_4$-$\overset{O}{\overset{\|}{P}}$(OC$_2$H$_5$)-O-C(CH$_3$)(Cl)-CONHC$_3$H$_6$OCH$_3$ <br> P calc.: 8.24%. P found: 8.43%. |
| 26 | $CH_3COCH_2CONHC_3H_6OCH_3$ | do | $(C_2H_5O)_2P$ / $(C_2H_5)_2N$ | $C_2H_5O$-$\overset{O}{\overset{\|}{P}}$[N(C$_2$H$_5$)$_2$]-OC(CH$_3$)=C(Cl)-CONHC$_3$H$_6$OCH$_3$ <br> P calc.: 8.35%. P found: 8.89%. |

EXAMPLE 5

(a) 2.3 parts of sodium chippings are dissolved in 70 parts by volume of absolute alcohol. There are added 15.9 parts of acetoacetic acid methoxyethylamide, and the solvent is removed in vacuo at a bath temperature of 30 to 40° C. The residue is stirred with 100 parts by volume of absolute ether, and 17.25 parts of diethyl chlorophosphate are added dropwise. The mixture is then maintained for a further 6 hours at the boil under reflux. After being cooled, the ethereal solution is washed with 20 parts by volume of water. The aqueous extract is agitated with 25 parts by volume of methylene chloride. The ethereal solution and the methylene chloride solution are combined and washed with 10 parts by volume of sodium bicarbonate solution. The solution is dried over sodium sulfate and then evaporated in vacuo at 40 to 50° C. As residue there are obtained 17.2 parts of a compound of the formula

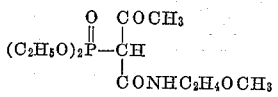

or

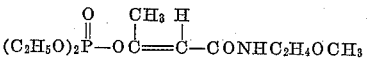

*Analysis.*—Calculated: P=10.49%. Found: P=9.9%.

(b) In a manner analogous to that described under (a) the sodium salt of 15.9 parts of acetoacetic acid methoxyethylamide is reacted with 17.85 parts of diethyl chlorothiophosphate, and there are obtained 25 parts of a compound of the formula:

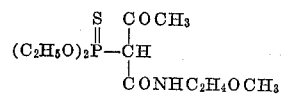

or

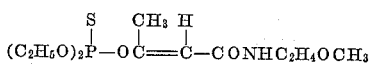

*Analysis.*—Calculated: P=9.95%. Found: P=10.1%.

EXAMPLE 6

2 parts of one of the condensation products obtained as described in Examples 1 to 5 are mixed with one part of the condensation product of one molecular proportion of tertiary octyl-phenol and 8 molecular proportions of ethylene oxide, and 7 parts of isopropanol. There is obtained a clear solution which can be used as a concentrate for preparing a spraying liquor, for which purpose it can be emulsified by pouring it into water.

A. In order to determine the contact action on aphids the following experiments were carried out with spray liquors containing 0.08%, 0.04%, 0.02% and 0.01% of active substance.

Broad bean plants, which were heavily infested with aphids, were sprayed on all sides, and the action was observed after 48 hours. When the action was 100%, the plants were infected with fresh aphids, and the action was observed after a further 48 hours. The results are given in the following Tables II and III.

Table II
ACTION ON APHIDS AFTER 48 HOURS

| Concentration of the active substance in the spray liquor, percent | Ex. 1 | Ex. 2 | Ex. 3 | Ex. 4(a) | Ex. 4(b) Tab. I Com. No. 1 | Ex. 4(b) Tab. I Com. No. 2 | Ex. 4(b) Tab. I Com. No. 3 | Ex. 4(b) Tab. I Com. No. 4 | Ex. 4(b) Tab. I Com. No. 5 |
|---|---|---|---|---|---|---|---|---|---|
| 0.08 | ++ | ++ | ++ | ++ | ++ | ++ | ++ | ++ | ++ |
| 0.04 | ++ | ++ | ++ | ++ | ++ | ++ | ++ | ++ | ++ |
| 0.02 | ++ | ++ | ++ | II | ++ | ++ | ++ | ++ | ++ |
| 0.01 | ++ | ++ | ++ | II | ++ | ++ | ++ | ++ | ++ |

| Concentration of the active substance in the spray liquor, percent | Ex. 4(b) Tab. I Com. No. 6 | Ex. 4(b) Tab. I Com. No. 7 | Ex. 4(b) Tab. I Com. No. 8 | Ex. 4(b) Tab. I Com. No. 10 | Ex. 4(b) Tab. I Com. No. 11 | Ex. 4(b) Tab. I Com. No. 12 | Ex. 4(b) Tab. I Com. No. 16 | Ex. 4(b) Tab. I Com. No. 17 | Ex. 4(b) Tab. I Com. No. 18 |
|---|---|---|---|---|---|---|---|---|---|
| 0.08 | ++ | ++ | ++ | ++ | ++ | ++ | ++ | ++ | ++ |
| 0.04 | ++ | ++ | ++ | ++ | ++ | ++ | ++ | ++ | ++ |
| 0.02 | ++ | ++ | ++ | ++ | ++ | ++ | ++ | ++ | ++ |
| 0.01 | I- | ++ | ++ | +I | ++ | ++ | ++ | ++ | ++ |

Table III
ACTION ON APHIDS 48 HOURS AFTER RE-INFECTION

| Concentration of the active substance in the spray liquor, percent | Ex. 1 | Ex. 2 | Ex. 3 | Ex. 4(a) | Ex. 4(b) Tab. I Com. No. 1 | Ex. 4(b) Tab. I Com. No. 2 | Ex. 4(b) Tab. I Com. No. 3 | Ex. 4(b) Tab. I Com. No. 4 | Ex. 4(b) Tab. I Com. No. 5 |
|---|---|---|---|---|---|---|---|---|---|
| 0.08 | ++ | ++ | ++ | II | ++ | +I | ++ | ++ | ++ |
| 0.04 | ++ | +I | ++ | -- | +I | II | ++ | ++ | ++ |
| 0.02 | +I | +I | +I | -- | +I | -- | ++ | ++ | ++ |
| 0.01 | II | II | +I | -- | II | -- | ++ | II | II |

| Concentration of the active substance in the spray liquor, percent | Ex. 4(b) Tab. I Com. No. 6 | Ex. 4(b) Tab. I Com. No. 7 | Ex. 4(b) Tab. I Com. No. 8 | Ex. 4(b) Tab. I Com. No. 10 | Ex. 4(b) Tab. I Com. No. 11 | Ex. 4(b) Tab. I Com. No. 12 | Ex. 4(b) Tab. I Com. No. 16 | Ex. 4(b) Tab. I Com. No. 17 | Ex. 4(b) Tab. I Com. No. 18 |
|---|---|---|---|---|---|---|---|---|---|
| 0.08 | ++ | ++ | ++ | +I | ++ | ++ | ++ | ++ | ++ |
| 0.04 | ++ | ++ | ++ | +I | ++ | ++ | ++ | II | II |
| 0.02 | ++ | ++ | ++ | ++ | ++ | ++ | ++ | II | II |
| 0.01 | -- | II | -- | -- | ++ | II | II | -- | -- |

For each plant a symbol is used. The symbols have the following meanings: + denotes that no living aphids were present, — denotes insufficient or no action, I denotes a good action with only a few surviving aphids.

B. In order to determine the action on aphids by diffusion through the leaves the following experiments were carried out with spray liquors containing 0.08%, 0.04%, 0.02% and 0.01% of active substance.

Broad bean plants, which were infested with aphids only on the undersides of the leaves, were sprayed with the above spray liquors only on the upper sides of the leaves, and after 48 hours the action upon the undersides of the leaves was observed. The results obtained are given in the following Table IV.

or of commercial oleylamine with 15 mols of ethylene oxide, or of dodecyl mercaptan with 12 mols of ethylene oxide. Among anion-active emulsifying agents there may be mentioned: the sodium salt of dodecyl alcohol sulfonic acid ester, the sodium salt of dodecyl-benzene sulfonic acid, the potassium or triethanolamine salt of oleic acid or of abietic acid or a mixture of these acids, or the sodium salt of a petroleum sulfonic acid.

Instead of isopropanol, another solvent may be used for preparing spray liquor concentrates, for example, ethyl alcohol, methanol, butanol, acetone, methyl ethyl ketone, methyl-cyclohexanol, benzene, toluene, xylene, kerosene, or a petroleum fraction. It will be understood that mixtures of different solvents may be used.

Table IV

| Concentration of the active substance in the spray liquor, percent | Ex. 1 | Ex. 2 | Ex. 3 | Ex. 4(a) | Ex. 4(b) Tab. I Com. No. 1 | Ex. 4(b) Tab. I Com. No. 2 | Ex. 4(b) Tab. I Com. No. 3 | Ex. 4(b) Tab. I Com. No. 4 | Ex. 4(b) Tab. I Com. No. 5 | Ex. 4(b) Tab. I Com. No. 6 |
|---|---|---|---|---|---|---|---|---|---|---|
| 0.08 | ++++ | ++++ | ++++ | ++II | ++++ | ++++ | ++++ | ++++ | ++++ | ++++ |
| 0.04 | ++++ | ++++ | ++++ | ++II | ++++ | III- | ++++ | ++++ | ++++ | ++++ |
| 0.02 | ++++ | ++-- | ++++ | ---- | +III | ---- | ++++ | ++-- | ++++ | ++++ |
| 0.01 | ++++ | ---- | II-- | ---- | ---- | ---- | ++++ | ---- | +III | ---- |

| Concentration of the active substance in the spray liquor, percent | Ex. 4(b) Tab. I Com. No. 7 | Ex. 4(b) Tab. I Com. No. 8 | Ex. 4(b) Tab. I Com. No. 9 | Ex. 4(b) Tab. I Com. No. 10 | Ex. 4(b) Tab. I Com. No. 11 | Ex. 4(b) Tab. I Com. No. 12 | Ex. 4(b) Tab. I Com. No. 16 | Ex. 4(b) Tab. I Com. No. 17 | Ex. 4(b) Tab. I Com. No. 18 |
|---|---|---|---|---|---|---|---|---|---|
| 0.08 | ++++ | ++++ | ++++ | ++++ | ++++ | ++++ | ++++ | ++++ | ++++ |
| 0.04 | ++++ | ++++ | ++++ | ++++ | ++++ | ++++ | ++++ | ++++ | ++++ |
| 0.02 | ++++ | ++++ | ++II | ++++ | ++++ | ++++ | ++++ | ++++ | ++++ |
| 0.01 | ++++ | ++++ | ---- | ---- | ++++ | ++++ | ++++ | ++II | ---- |

The compounds of Examples 1 to 5 exhibit a good to very good contact poison or stomach poison action against *Musca domestica*. The compounds of Examples 1, 2, 3, 4(a) and also compounds Nos. 1–12, 15–21 and 23 in Table I of Example 4(b) also exhibit a good to very good acaricidal action against red spider mites *Tetranychus urticae*. The compounds of Examples 1 to 4(a) and compounds numbers 1, 3, 5, 7, 9–11, 13–18, 20, 23 and 24 in Table I of Example 4(b) also exhibit a stomach poison action against *Carausius morosus*, *Orgyia gonostigma* or *Gastroidea viridula*.

For making the spray liquor concentrates there may be used other wetting or emulsifying agents than those mentioned above. There may be used non-ionic products, for example, condensation products of aliphatic alcohols, amines or carboxylic acids containing a hydrocarbon radical having a long chain of about 10 to 30 carbon atoms with ethylene oxide, such as the condensation product of octadecyl alcohol with 25 to 30 mols of ethylene oxide, or of soya bean fatty acid with 30 mols of ethylene oxide,

What is claimed is:
1. An organic phosphorus compound of the formula

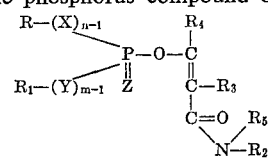

wherein R and $R_1$ each represents a radical selected from the group consisting of an alkyl radical containing up to 18 carbon atoms, a cyclohexyl radical, a phenyl radical, a benzyl radical, a tetrahydrofurfuryl radical and a radical wherein R and $R_1$ together form part of a ring system, $R_2$ represents a member selected from the group consisting of (a) a radical of the formula:

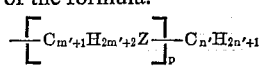

in which $m'$ and $n'$ each represents a whole number of at the most 8, p represents a whole number of at most 3, and Z represents a member selected from the group consisting of an oxygen atom and a sulfur atom, and (b) a lower alkoxy phenyl radical, $R_5$ represents a member selected from the group consisting of a hydrogen atom, an alkyl radical containing at most 8 carbon atoms and the same radical as $R_2$, $R_3$ represents a member selected from the group consisting of a hydrogen atom, a halogen atom and an alkyl radical containing at most 4 carbon atoms, $R_4$ represents a member selected from the group consisting of an alkyl radical containing at most 4 carbon atoms, a phenyl radical, a chlorophenyl radical, a nitrophenyl radical, a cyclohexyl radical and a tetrahydrofurfuryl radical, X and Y each represents a member selected from the group consisting of —O—, —S—, —NH—, and >N—R (R being an alkyl radical containing at most 4 carbon atoms), $n$ and $m$ each represent a whole number of at the most 2, and Z represents a member selected from the group consisting of an oxygen atom and a sulfur atom.

2. An organic phosphorus compound of the formula

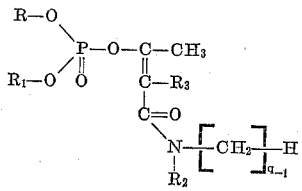

wherein R and $R_1$ each represents an alkyl radical containing at most 8 carbon atoms, $R_2$ represents the radical of the formula

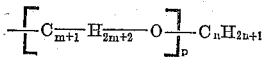

in which $m$ and $n$ each represents a whole number of at the most 8, $p$ represents a whole number of at the most 3, $R_3$ represents a halogen atom and $q$ represents a whole number of at the most 2.

3. An organic phosphorus compound of the formula

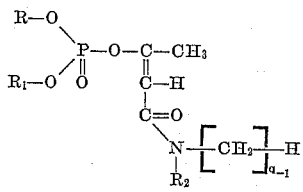

wherein R and $R_1$ each represents an alkyl radical containing at most 8 carbon atoms, $R_2$ represents the radical of the formula

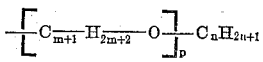

in which $m$ and $n$ each represents a whole number of at the most 8, $p$ represents a whole number of at the most 3, and $q$ represents a whole number of at the most 2.

4. An organic phosphorus compound of the formula

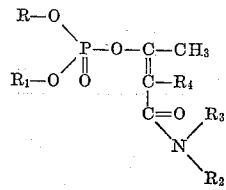

in which R and $R_1$ each represents an alkyl radical containing at most 8 carbon atoms, $R_2$ and $R_3$ each represents a radical of the formula

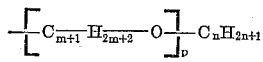

in which $m$ and $n$ represents a whole number of at the most 8, $p$ represents a whole number of at the most 3 and $R_4$ represents a halogen atom.

5. The compound of the formula

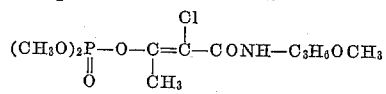

6. The compound of the formula

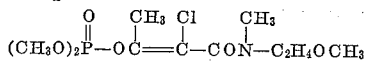

7. The compound of the formula

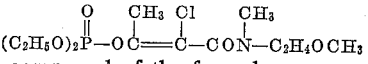

8. The compound of the formula

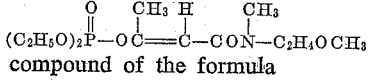

9. The compound of the formula

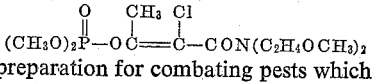

10. A preparation for combating pests which comprises an organic phosphorus compound of the formula

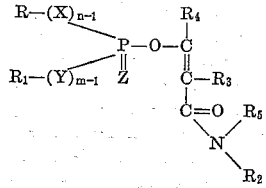

wherein R and $R_1$ each represents a radical selected from the group consisting of an alkyl radical containing up to 18 carbon atoms, a cyclohexyl radical, a phenyl radical, a benzyl radical, a tetrahydrofurfuryl radical and a radical wherein R and $R_1$ together form part of a ring system, $R_2$ represents a member selected from the group consisting of (a) a radical of the formula:

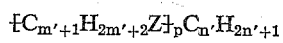

in which $m'$ and $n'$ each represents a whole number of at the most 8, $p$ represents a whole number of at most 3, and Z represents a member selected from the group consisting of an oxygen atom and a sulfur atom, and (b) a lower alkoxy phenyl radical, $R_5$ represents a member selected from the group consisting of a hydrogen atom, an alkyl radical containing at most 8 carbon atoms and the same radical as $R_2$, $R_3$ represents a member selected from the group consisting of a hydrogen atom, a halogen atom and an alkyl radical containing at most 4 carbon atoms, $R_4$ represents a member selected from the group consisting of an alkyl radical containing at most 4 carbon atoms, a phenyl radical, a chlorophenyl radical, a nitrophenyl radical, a cyclohexyl radical and a tetrahydrofurfuryl radical, X and Y each represents a member selected from the group consisting of —O—, —S—, —NH—, and >N—R (R being an alkyl radical containing at most 4 carbon atoms), $n$ and $m$ each represents a whole number of at the most 2, and Z represents a member selected from the group consisting of an oxygen atom and a sulfur atom, in admixture with a member selected from the group consisting of a pesticidally inactive substance and another pesticide.

11. A preparation of combating pests which comprises an organic phosphorus compound of the formula

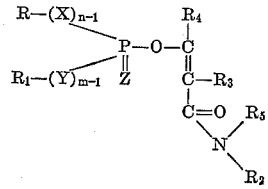

wherein R and $R_1$ each represents a radical selected from the group consisting of an alkyl radical containing up to 18 carbon atoms, a cyclohexyl radical, a phenyl radical, a benzyl radical, a tetrahydrofurfuryl radical and a radical wherein R and $R_1$ together form part of a ring system, $R_2$ represents a member selected from the group consisting of (a) a radical of the formula:

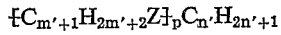

in which $m'$ and $n'$ each represents a whole number of at the most 8, $p$ represents a whole number of at most 3, and Z represents a member selected from the group consisting of an oxygen atom and a sulfur atom, and (b) a lower alkoxy phenyl radical, $R_5$ represents a member selected from the group consisting of a hydrogen atom, an alkyl radical containing at most 8 carbon atoms and the same radical as $R_2$, $R_3$ represents a member selected from the group consisting of a hydrogen atom, a halogen atom and an alkyl radical containing at most 4 carbon atoms, $R_4$ represents a member selected from the group consisting of an alkyl radical containing at most 4 carbon atoms, a phenyl radical, a chlorophenyl radical, a nitrophenyl radical, a cyclohexyl radical and a tetrahydrofurfuryl radical, X and Y each represents a member selected from the group consisting of —O—, —S—, —NH—, and >N—R (R being an alkyl radical containing at most 4 carbon atoms), $n$ and $m$ each represents a whole number of at the most 2, and Z represents a member selected from the group consisting of an oxygen atom and a sulfur atom, in admixture with a pesticidally inactive carrier.

12. A preparation for combating pests which comprises an organic phosphorus compound of the formula

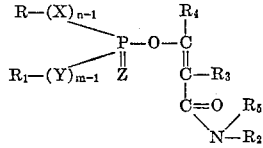

wherein R and $R_1$ each represents a radical selected from the group consisting of an alkyl radical containing up to 18 carbon atoms, a cyclohexyl radical, a phenyl radical, a benzyl radical, a tetrahydrofurfuryl radical and a radical wherein R and $R_1$ together form part of a ring system, $R_2$ represents a member selected from the group consisting of (a) a radical of the formula:

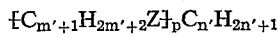

in which $m'$ and $n'$ each represents a whole number of at the most 8, $p$ represents a whole number of at most 3, and Z represents a member selected from the group consisting of an oxygen atom and a sulfur atom, and (b) a lower alkoxy phenyl radical, $R_5$ represents a member selected from the group consisting of a hydrogen atom, and alkyl radical containing at most 8 carbon atoms and the same radical as $R_2$, $R_3$ represents a member selected from the group consisting of a hydrogen atom, a halogen atom and an alkyl radical containing at most 4 carbon atoms, $R_4$ represents a member selected from the group consisting of an alkyl radical containing at most 4 carbon atoms, a phenyl radical, a chlorophenyl radical, a nitrophenyl radical, a cyclohexyl radical and a tetrahydrofurfuryl radical, X and Y each represents a member selected from the group consisting of —O—, —S—, —NH—, and >N—R (R being an alkyl radical containing at most 4 carbon atoms), $n$ and $m$ each represent a whole number of at the most 2, and Z represents a member selected from the group consisting of an oxygen atom and a sulfur atom, in admixture with a dispersing agent.

13. The method of controlling pests which comprises applying to materials that are subject to attack by pests a pesticidal amount of an organic phosphorus compound of the formula

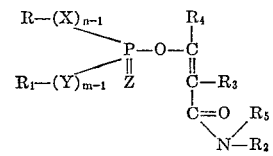

wherein R and $R_1$ each represents a radical selected from the group consisting of an alkyl radical containing up to 18 carbon atoms, a cyclohexyl radical, a phenyl radical, a benzyl radical, a tetrahydrofurfuryl radical and a radical wherein R and $R_1$ together form part of a ring system, $R_2$ represents a member selected from the group consisting of (a) a radical of the formula:

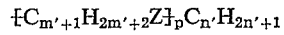

in which $m'$ and $n'$ each represents a whole number of at the most 8, $p$ represents a whole number of at most 3, and Z represents a member selected from the group consisting of an oxygen atom and a sulfur atom, and (b) a lower alkoxy phenyl radical, $R_5$ represents a member selected from the group consisting of a hydrogen atom, an alkyl radical containing at most 4 carbon atoms and the same radical as $R_2$, $R_3$ represents a member selected from the group consisting of a hydrogen atom, a halogen atom and an alkyl radical, containing at most 4 carbon atoms, $R_4$ represents a member selected from the group consisting of an alkyl radical containing at most 4 carbon atoms, a phenyl radical, a chlorophenyl radical, a nitrophenyl radical, a cyclohexyl radical and a tetrahydrofurfuryl radical, X and Y each represents a member selected from the group consisting of —O—, —S—, —NH—, and >N—R (R being an alkyl radical containing at most 4 carbon atoms), $n$ and $m$ each represent a whole number of at the most 2, and Z represents a member selected from the group consisting of an oxygen atom and a sulfur atom.

References Cited in the file of this patent

UNITED STATES PATENTS

| | | |
|---|---|---|
| 2,802,855 | Whetstone et al. | Aug. 13, 1957 |
| 2,908,605 | Beriger et al. | Oct. 13, 1959 |
| 2,943,975 | Metivier | July 5, 1960 |